(12) United States Patent
Hayslett et al.

(10) Patent No.: US 10,059,399 B2
(45) Date of Patent: Aug. 28, 2018

(54) MID DRIVE ELECTRIC BICYCLE POWERFLOW WITH PLANETARY GEAR OVERDRIVE AND STEPPED PINION PLANETARY

(71) Applicant: GM Global Technology Operations LLC, Detroit, MI (US)

(72) Inventors: Steven L. Hayslett, Troy, MI (US); Shawn H. Swales, Canton, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 482 days.

(21) Appl. No.: 14/815,268

(22) Filed: Jul. 31, 2015

(65) Prior Publication Data

US 2017/0029065 A1 Feb. 2, 2017

(51) Int. Cl.
| | | |
|---|---|---|
| *B62M 11/18* | (2006.01) | |
| *B62M 6/55* | (2010.01) | |
| *F16H 3/66* | (2006.01) | |
| *B62M 6/50* | (2010.01) | |
| *B62M 11/14* | (2006.01) | |

(52) U.S. Cl.
CPC .............. *B62M 6/55* (2013.01); *B62M 6/50* (2013.01); *B62M 11/145* (2013.01); *B62M 11/18* (2013.01); *F16H 3/66* (2013.01)

(58) Field of Classification Search
CPC . B62M 6/55; B62M 6/70; B62M 6/50; B62M 11/145; B62M 11/18; B62M 11/14; F16H 3/66
See application file for complete search history.

(56) References Cited

FOREIGN PATENT DOCUMENTS

| EP | 2319754 A1 * | 5/2011 | .............. B62M 6/50 |
|---|---|---|---|
| WO | WO-2011023163 A2 * | 3/2011 | .............. B62M 6/55 |

OTHER PUBLICATIONS

U.S. Appl. No. 14/714,495 ; Title: Electric Bike Powertrain With Dual Planetary Gear Sets and Ring Gear Pedal Reaction Torque Measurement; First Named Inventor; Steven L. Hayslett; filed May 18, 2015.

* cited by examiner

*Primary Examiner* — Erin D Bishop
(74) *Attorney, Agent, or Firm* — Lorenz & Kopf, LLP

(57) ABSTRACT

A product may include a gear set that may have a first gear, a second gear that may be engaged with the first gear and a third gear. The third gear may be held from rotation and may be engaged with the second gear. A carrier may carry the second gear for rotation. A crank may be continuously connected with the carrier to provide input thereto. A torque measurement device may be connected to the third gear.

19 Claims, 1 Drawing Sheet

MID DRIVE ELECTRIC BICYCLE POWERFLOW WITH PLANETARY GEAR OVERDRIVE AND STEPPED PINION PLANETARY

TECHNICAL FIELD

The field to which the disclosure generally relates includes electric cycles, and more particularly, electric cycles with planetary drive mechanisms.

BACKGROUND

An electric cycle may have various wheel arrangements and may include an on-board electric motor that can be used for propulsion through one or more gears.

SUMMARY OF ILLUSTRATIVE VARIATIONS

A number of variations may involve a product that may include a gear set that may have a first gear, a second gear that may be engaged with the first gear, and a third gear. The third gear may be held from rotation and may be engaged with the second gear. A carrier may carry the second gear for rotation. A crank may be continuously connected with the carrier to provide input thereto. A torque measurement device may be connected to the third gear.

Other illustrative variations within the scope of the invention will become apparent from the detailed description provided herein. It should be understood that the detailed description and specific examples, while disclosing variations within the scope of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein.

DETAILED DESCRIPTION OF ILLUSTRATIVE VARIATIONS

The following description of the variations is merely illustrative in nature and is in no way intended to limit the scope of the invention, its application, or uses.

Figure 1:
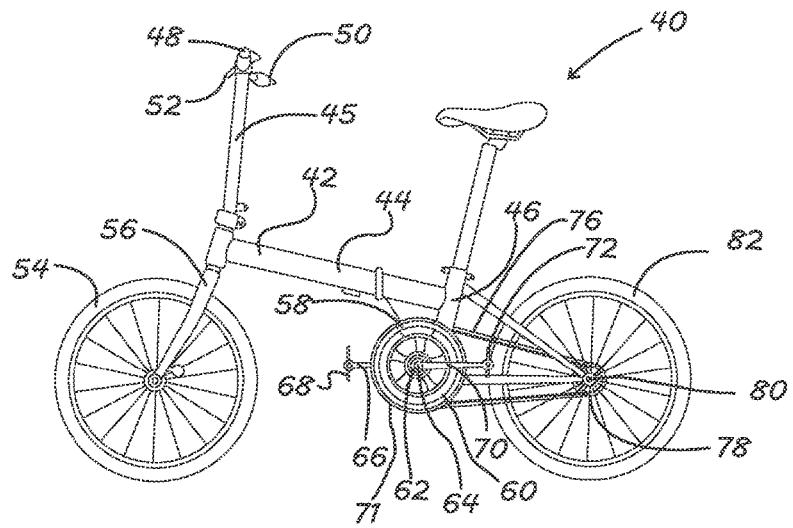
FIG. 1 illustrates an electric cycle according to a number of variations.

FIG. 1 illustrates a number of variations which may include an electric cycle 40. In any of a number of variations, the electric cycle 40 may include a frame 42 which may include a top tube 44 connected to a seat tube 46. A steering tube 45 may extend from the top tube 44. The steering tube 45 may be operatively connected to a front fork 56 which may be attached to a front wheel 54. Handlebars 48 may be attached to the steering tube 45 and may be used to control the direction of the front wheel 54 by way of the front fork 56. Control levers 50 may be provided on the handlebars 48 and may be constructed and arranged to communicate with one or more electronic control devices 58, one or more mechanical mechanisms that will be described later, and/or a motor 60. The one or more electronic control devices 58 may include electronic processing components to receive input signals and to send out signals to control various components of the electric cycle 40, which may include sending output signals to control operation of the electric motor 60. In a number of variations the one or more electronic control devices 58 may include memory, a processor and software and/or hardware to process input signals and generate output signals, and may include formulas, lookup tables or other means for comparing and processing data. A brake lever 52 may also be provided on the handlebars 48, if desired.

The electric cycle 40 may also include a crank assembly 62 which may include a crankshaft 64 having a first pedal assembly 66 and a second pedal assembly 70 connected thereto. The first pedal assembly 66 may include a first foot pedal 68, and the second pedal assembly 70 may include a second foot pedal 72. A linked element 71, which may be a sprocket or a pulley or another device, may be operatively connected to the crankshaft 64 for driving a linking member 76. The linking member 76 may be a chain or belt or another link suitable for engaging the linked element 71 and may be operatively connected to a rear linked element 78 which may be operatively connected to a hub 80 of a rear wheel 82. The linked element 78 may be a sprocket or pulley or another device suitable for engaging with the linking member 76.

The electric cycle 40 may be constructed and arranged to allow a rider to rotate a first and second pedal assembly 66, 70 in a full clockwise or counter clockwise rotation to power the electric cycle 40 or may allow a rider to use a pedal force-based propulsion system wherein the first and second pedal assemblies 66, 70 may be fixed in an approximately horizontal position so that a rider may provide intuitive input commands by applying a force to a first foot pedal 68 attached to the first pedal assembly 66 or a second foot pedal 72 attached to the second pedal assembly 70 in the clockwise or counter clockwise direction. The input commands may be intuitive to the rider and may be similar to riding a non-motorize cycle wherein the rider applies a clockwise force to a cycle crank by applying force to a forward positioned foot pedal to move the cycle in a forward direction, and the rider applies a counter clockwise force to the cycle crank by applying force to a rearward positioned foot pedal to slow the cycle. Reference herein as to clockwise or counterclockwise is made with respect to the right hand side of the cycle with an operator facing the forward direction of movement of the electric cycle 40. The electric cycle 40 may be a bicycle, tricycle, or four-wheel electric cycle having a crank assembly 62 constructed and arranged to allow a rider to provide input thereto using the first pedal assembly 66 and the second pedal assembly 70.

Figures 2, 3:
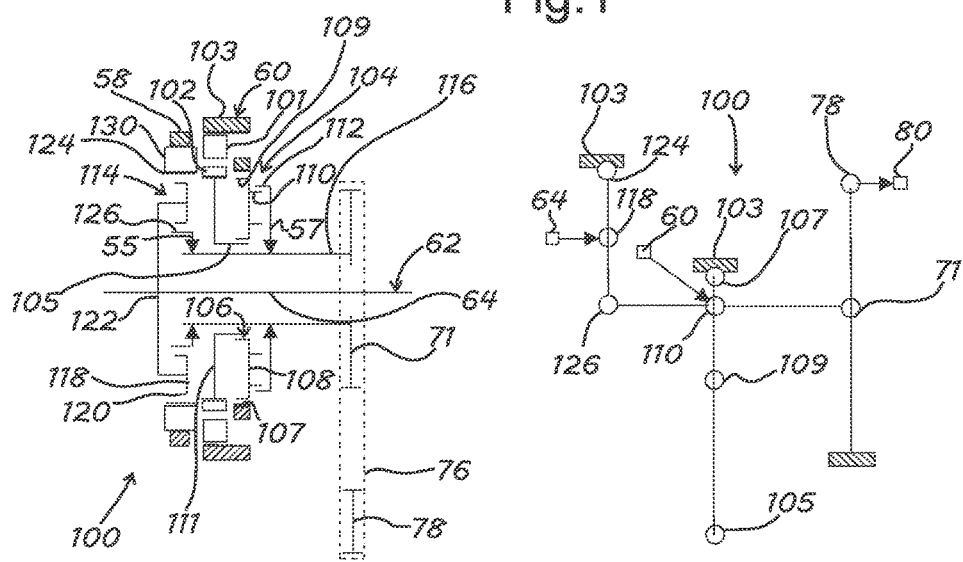
FIG. 2 illustrates a schematic of an electric cycle powertrain according to a number of variations.
FIG. 3 illustrates lever diagrams for an electric cycle powertrain according to a number of variations.

Referring to FIGS. 2 and 3 along with FIG. 1, in a number of variations, the electric cycle 40 may include a product 100 that may include the electric motor/generator 60 which may be used to propel the electric cycle 40 and to generate electricity from motor/generator regenerative braking. The motor/generator 60 may be attached to the electric cycle 40 at the frame 42 and may be adjacent the pedal assemblies 66, 70, linked element 71 and/or crankshaft 64. The motor/generator 60 may include any of a number of types of motor/generators including, but not limited to, a brushless ring motor. The motor/generator 60 may include a stator 101 and a rotor 102. The rotor 102 may rotate within the stator 101 which may be held or grounded to a case 103. The motor/generator 60 may be powered by a battery or any number of batteries or battery assemblies. In a number of variations, one or more gear sets may be located within the motor 60. In one variation, a first gear set 104, which may be a planetary gear set, may be operatively connected with the motor 60 and may be included therewith as part of a common assembly, and may be used to provide additional gear ratios to the motor 60.

In a number of variations, the first gear set 104 may include a gear 105 that may be a sun gear, and which may be operatively engaged with one or more gears 106, which may be planetary gears so that when the gear 105 is rotated, it may cause the one or more gears 106 to rotate within a ring gear 107, which may be held or grounded. In a number of variations, the one or more gears 106 may be operatively connected to a carrier 108 and may cause the carrier 108 to rotate when the one or more gears 106 may be rotated. The one or more gears 106 may be stepped pinion gears with a larger diameter pinion 109 engaged with the gear 107, and a smaller diameter pinion 110 engaged with the linked element 71 through a torque transfer element 112, the selectively engaged mechanical mechanism 57, and a torque transfer element 116. The torque transfer element 112 may be a part of the mechanical mechanism 57 or may be connected thereto. The torque transfer element 112 may include, or may be, a ring gear that may have internal teeth meshing with the pinion 110. The gear set 104 may be operatively connected to the linking member 76 through the linked element 71. The linking member 76 may drive the rear linked element 78.

In a number of variations the gear 105 may rotate the one or more gears 106 and the carrier 108 when driven by the motor 60 through a torque transfer element 111. With gear 107 held or grounded, which may prevent its rotation, the one or more gears 106 may travel around the inside of the gear 107 and the carrier 108 may rotate in the same direction as the rotor 102 and at a slower speed. This may allow for high speed input from the motor 60 to the linked element 71, reduced through the gear set 104.

In a number of variations output from the gear set 104 may be provided through the pinion 110. The pinion 110 may be connected with the pinion 109 and may rotate in the same direction but due to its smaller diameter may provide a slower relative output. From the pinion 110, torque may be transferred through a torque transfer element 112 and the mechanical mechanism 57 to the torque transfer element 116 that may be connected with the linked element 71. The torque transfer element 112 may include a gear for engagement with the pinion 110. The torque transfer element 116 may be a tube or other structural element for engagement between the mechanical mechanism 57, the linked element 71, and for providing additional functions described below.

In a number of variations, the mechanical mechanism 57 may be operatively connected between the torque transfer element 112 and the torque transfer element 116. The mechanical mechanism 57 may be constructed and arranged so that when closed, torque to the linked element 78 may be generated by rotation of the rotor 102, and recovery torque may be passed from the rear linked element 78 to the motor 60 which may also operate as a generator. In a number of variations, the mechanical mechanism 57 may be a clutch and/or may include a selectively operated clutch mechanism as known in the art to provide open and closed states between the torque transfer elements 112, 116. The mechanical mechanism 57 may be mechanically, electrically or otherwise actuated, or by a combination thereof.

In a number of variations a second gear set 114 may be operatively connectable with, and driven by, the rotor 102 of the motor 60 through the torque transfer element 116 and/or by the crank assembly 62 through the crankshaft 64. The second gear set 114 may include a carrier 118 which may be operatively connected with one or more gears 120, which may be planet gears. The crank assembly 62 may be connected with the carrier 118 through the crankshaft 64 and a torque transfer element 122, so that when the pedals 68, 72 may rotate the crank, the carrier 118 may be rotated through the crankshaft 64 and the torque transfer element 122. The crankshaft 64 may extend through the torque transfer element 116. In a number of variations, rotation of the carrier 118 may cause the one or more gears 120 to rotate and to travel around the inside of a gear 124, which may be a ring gear with internal teeth, and may be held or grounded. As such, the gear 124 may be a nonrotating element. In a number of variations the one or more gears 120 may be operatively connected with a mechanical mechanism 55 through a torque transfer element which may be or may include a gear 126, and which may be the gear 126. The gear 126 may be a sun gear and may include teeth that may mesh with and may be engaged with the one or more gears 120. The mechanical mechanism 55 may be operatively engaged with the torque transfer element 116 so that when closed, rotation of the crank assembly 62 may result in rotation of the linked element 71 through the crankshaft 64, the torque transfer element 122, the carrier 118, the one or more gears 120, the gear 126, the mechanical mechanism 55 and the torque transfer element 116. The mechanical mechanism 55 may be of any type suitable to provide at least one of the following: (1) allowing for the free rotation of the first and second pedal assemblies 66, 70 in both the clockwise and counterclockwise directions; (2) locking the first and second pedal assemblies 66, 70 and preventing rotation in both the clockwise and counterclockwise directions; (3) locking the first and second pedal assemblies 66, 70 preventing movement in the clockwise direction and allowing rotation in the counterclockwise direction; or (4) locking the first and second pedal assemblies 66, 70 preventing rotation in the counterclockwise direction but allowing rotation in the clockwise direction. In addition, the mechanical mechanism 55 may allow for rotation of the torque transfer element 116 faster than rotation of the crank assembly 62 such as in an overrunning state. The mechanical mechanisms 55, 57 may be of the type disclosed in U.S. patent application Ser. No. 14/714,495 titled Electric Bike Powertrain with Dual Planetary Gear Sets and Ring Gear Pedal Reaction Torque Measurement, filed May 18, 2015, which is specifically incorporated herein by reference. In a number of other variations the mechanical mechanisms 55, 57 may be a clutch as known in the art.

In a number of variations, a torque measurement device 130 that may be constructed and arranged to measure torque and that may include, but not be limited to, a strain gauge as known in the art. The torque measurement device 130 may also be operatively connected to the gear set 114 and may be used to measure the reaction torque from the pedal input on crank assembly 62. The torque measurement device 130 may be operatively connected between the gear 124 and ground at the case 103, and may measure reaction torque of the gear 124 which may be proportional to the rider input torque through the crank assembly 62. The torque measurement device 130 may be used to control the operation of at least one of the electric motor 60 or a regenerative braking system in the electric motor 60.

The electric cycle 40 may be constructed and arranged to selectively provide for at least one of the following functions or modes: (A) Pedal assist, wherein the torque (and optionally the speed, position, and direction of the crank) is detected and assistance in rotating the crankshaft 64 is provided by the electric motor 60 in response to the detected torque, (and optionally the speed and direction of the crankshaft 64); (B) Coast with spinning motor 60 synchronized with the road, wherein the crankshaft 64 is de-coupled to the electric motor and the rider is not rotating the pedal assemblies 66, 70 of the electric cycle 40, but the wheels 54, 82 and motor 60 are spinning; (C) Coast without spinning motor synchronized with the road, wherein the crankshaft 64 is not coupled to the motor 60 and the motor 60 is not coupled to the linked element 71; (D) Electronic coaster with regenerative braking mode, wherein the first and second pedals assemblies 66, 70 may not be rotating and the crankshaft 64 is de-coupled from the electric motor 60, and the rider may apply a backward force to the first or second foot pedal 68, 72 so that the torque measurement device 130 may measure the reaction torque and may cause a regenerative braking command to be sent to the motor 60 to generate energy which may be delivered into the battery; (E) Regenerative braking mode, wherein the motor 60 slows down the electric cycle 40 while a regenerative braking command may be sent to the motor 60 to generate energy which may be delivered into the battery; (F) Pedal force throttle mode, wherein a clockwise torque/force of the crankshaft 64 may be measured when the mechanical mechanism 55 is closed and wherein the force applied on a pedal by the rider may be detected and used as a throttle input to the motor 60; (G) Pedal mode without back drive lockup, wherein the rider may rotate the crankshaft 64 in a clockwise direction to move the electric cycle 40 forward, and the rider may rotate the crankshaft 64 in a counter clockwise direction in a free spinning mode without back drive lockup or locking the rear wheel 82 when moving backwards; or (H) Security lock mode, wherein the first and second pedal assemblies 66, 70 may not be rotated clockwise or counterclockwise but the electric cycle 40 may be rolled.

FIG. 3 illustrates the product 100 in a lever diagram form. Torque measurement may be obtained from the grounded gear 124 in a simplified form since the torque measurement device 130 need not rotate. Driving torque for the hub 80 may be provided by the crank assembly 64 and/or the motor 60. An overdrive ratio that may be applicable over a wide range and may be provided through the held or grounded gear 124, with input to the carrier 118 and output through the gear 126. A maximum of speed increase may be obtained through this arrangement of the gear set 114.

The following description of variants is only illustrative of components, elements, acts, products and methods considered to be within the scope of the invention and are not in any way intended to limit such scope by what is specifically disclosed or not expressly set forth. The components, elements, acts, products and methods as described herein may be combined and rearranged other than as expressly described herein and still are considered to be within the scope of the invention.

Variation 1 may involve a product that may include a gear set that may have a first gear, a second gear that may be engaged with the first gear and a third gear. The third gear may be held from rotation and may be engaged with the second gear. A carrier may carry the second gear for rotation. A crank may be continuously connected with the carrier to provide input thereto. A torque measurement device may be connected to the third gear.

Variation 2 may include the product according to variation 1 and may include a linking member and a linked element that engaged with the linking member. The linked element may be connected to the third gear through a mechanical mechanism that may be constructed and arranged to selectively transfer torque between the third gear and the linked element.

Variation 3 may include the product according to variation 2 wherein the mechanical mechanism may be a clutch.

Variation 4 may include the product according to any of variations 1 through 3 and may include a second gear set that may have a fourth gear that may be shaped like a ring, a fifth gear that may be engaged with the fourth gear and a sixth gear that may be engaged with the fifth gear. A second carrier may carry the fifth gear for rotation. A motor may be included and may have a rotor that may be directly engaged with the sixth gear. A mechanical mechanism may be connected between the fifth gear and a linked element that may be selectively driven by the second gear set.

Variation 5 may include the product according to variation 4 wherein the mechanical mechanism may be connected to the linked element through a torque transfer element that may be tubular.

Variation 6 may include the product according to variation 4 or 5 wherein the mechanical mechanism may be constructed and arranged to selectively transfer torque between the fifth gear and the linked element.

Variation 7 may include the product according to any of variations 4 through 6 wherein the fifth gear may include a first pinion and a second pinion that may be smaller than the first pinion. The first pinion may be directly engaged with the fourth gear and the second pinion may be engaged with the linked element through a ring gear and the mechanical mechanism.

Variation 8 may include the product according to variation 7 and may include a torque transfer element connected between the ring gear and the mechanical mechanism.

Variation 9 may include the product according to any of variations 1 through 8 and may include a torque transfer element that may be tubular. The third gear may be connected to the torque transfer element and may provide output from the gear set. The crank may include a shaft that may extend through the torque transfer element.

Variation 10 may include the product according to variation 9 and may include a linked element connected to the torque transfer element. A linking member may be engaged with the linked element. A rear hub may be engaged with the linking member.

Variation 11 may involve a product that may include a first gear set that may have a first gear, a second gear that may mesh with the first gear, and a third gear that may mesh with the second gear. A first carrier may carrying the second gear. A second gear set may have a fourth gear, a fifth gear that may mesh with the fourth gear, and a sixth gear that may mesh with the fifth gear. A second carrier may carry the fifth gear. A crank assembly may be engaged with the first carrier and may provide input to the first gear set. A first mechanical mechanism may be connected between the third gear and a torque transfer element and may provide output from the first gear set. A motor may be engaged with the sixth gear and may provide input to the second gear set. The fifth gear may be connected to the torque transfer element through a second mechanical mechanism and may provide output from the second gear set.

Variation 12 may include the product according to variation 11 wherein the first gear may be held from rotating.

Variation 13 may include the product according to variation 12 and may include a torque device that may be connected to the first gear and may measure torque applied to the first gear.

Variation 14 may include the product according to variation 13 and may include a case that may house the first and second gear sets. The torque device may be connected between the first gear and the case.

Variation 15 may include the product according to any of variations 11 through 14 wherein the fifth gear may include a first pinion and a second pinion that may be smaller than the first pinion. The first pinion may be directly engaged with the fourth gear. The second pinion may be engaged with the mechanical mechanism.

Variation 16 may include the product according to any of variations 11 through 15 wherein the fourth gear may be held from rotating.

Variation 17 may include the product according to any of variations 11 through 15 and may include a linking member and a sprocket that may be drivingly engaged with the linking member. The sprocket may be fixed to the torque transfer element.

Variation 18 may involve an electric cycle powertrain that may include a wheel that may have a hub. A torque transfer element may be connected with the hub. First and second gear sets may be connected with the torque transfer element. The first gear set may have a first gear that may be held from rotation. A second gear may be engaged with the first gear and a third gear may be engaged with the second gear. The third gear may provide output from the first gear set to the torque transfer element. The second gear set may have a fourth gear, a fifth gear that may be engaged with the fourth gear, and a sixth gear that may be engaged with the fifth gear. The fifth gear may be connected with the torque transfer element and may provide output from the second gear set.

Variation 19 may include the product according to variation 18 and may include a torque measurement device that may be engaged with the first gear.

Variation 20 may include the product according to variation 18 or 19 and may include a motor that may have a rotor that may be engaged with the sixth gear.

The above description of select variations within the scope of the invention is merely illustrative in nature and, thus, variations or variants thereof are not to be regarded as a departure from the spirit and scope of the invention.

What is claimed is:

1. A product comprising a gear set that has a first gear, a second gear engaged with the first gear, and a third gear that is held from rotation and that is engaged with the second gear, a carrier carrying the second gear for rotation, a crank continuously connected with the carrier to provide input thereto, a torque measurement device connected to the third gear, a linking member, a linked element drivingly engaged with the linking member, a torque transfer element connected with the linked element, and a mechanical mechanism disposed between the first gear and the torque transfer element, the first gear selectively connected with the linked element through the mechanical mechanism and the torque transfer element.

2. The product according to claim 1 wherein the mechanical mechanism is a clutch.

3. The product according to claim 1 further comprising a second gear set that has a fourth gear shaped like a ring, a fifth gear engaged with the fourth gear and a sixth gear engaged with the fifth gear, a second carrier carrying the fifth gear for rotation, a motor that has a rotor directly engaged with the sixth gear, the linked element selectively driven by the second gear set, and a second mechanical mechanism connected between the fifth gear and the linked element.

4. The product according to claim 3 wherein the torque transfer element is tubular, and wherein the mechanical mechanism is connected to the linked element through the torque transfer element.

5. The product according to claim 3 wherein the second mechanical mechanism comprises a clutch.

6. The product according to claim 3 further comprising a seventh gear, wherein the fifth gear includes a first pinion and a second pinion smaller than the first pinion, the first pinion directly engaged with the fourth gear and the second pinion engaged with the linked element through the seventh gear and the second mechanical mechanism.

7. The product according to claim 6 further comprising a second torque transfer element connected between the seventh gear and the second mechanical mechanism.

8. The product according to claim 1 wherein the torque transfer element is tubular, and wherein the crank includes a shaft that extends through the torque transfer element.

9. The product according to claim 8 further comprising a rear hub engaged with the linking member.

10. A product comprising a first gear set that has a first gear, a second gear meshing with the first gear, a third gear meshing with the second gear, and a first carrier carrying the second gear, a second gear set that has a fourth gear, a fifth gear meshing with the fourth gear, a sixth gear meshing with the fifth gear, and a second carrier carrying the fifth gear, a crank assembly engaged with the first carrier to provide input to the first gear set, a torque transfer element, a first mechanical mechanism connected between the third gear and the torque transfer element, a motor engaged with the sixth gear to provide input to the second gear set, and a second mechanical mechanism, the fifth gear connected to the torque transfer element through the second mechanical mechanism.

11. The product according to claim 10 wherein the first gear is held from rotating.

12. The product according to claim 11 further comprising a torque device connected to the first gear that measures torque applied to the first gear.

13. The product according to claim 12 further comprising a case housing the first and second gear sets, the torque device connected between the first gear and the case.

14. The product according to claim 10 further comprising a seventh gear, wherein the fifth gear includes a first pinion and a second pinion smaller than the first pinion, the first pinion directly engaged with the fourth gear and the second pinion engaged with the mechanical second mechanism through the seventh gear.

15. The product according to claim 10 wherein the fourth gear is held from rotating.

16. The product according to claim 10 further comprising a linking member and a sprocket drivingly engaged with the linking member, the sprocket fixed to the torque transfer element.

17. An electric cycle powertrain comprising a wheel with a hub, a linked element, a linking element connecting the hub with the linked element, a torque transfer element connected with the hub through the linked element and the linking element, first and second gear sets connected with the torque transfer element through first and second mechanical mechanisms, the first gear set has a first gear that is held from rotation, a second gear engaged with the first gear and a third gear engaged with the second gear, the third gear configured to provide output from the first gear set through the first mechanical mechanism to the torque transfer element and the linked element, the second gear set has a fourth gear, a fifth gear engaged with the fourth gear, and a sixth gear engaged with the fifth gear, the fifth gear connected with the torque transfer element through the second mechanical mechanism and the fifth gear configured to provide output from the second gear set to the linked element.

18. The electric cycle powertrain according to claim 17 further comprising a case, housing the first and second gearsets, and a torque measurement device engaged between the first gear and the case.

19. The electric cycle powertrain according to claim 17 further comprising a crankshaft extending through the torque transfer element, and pedals connected to the crankshaft.

\* \* \* \* \*